United States Patent [19]
Jacobs et al.

[11] 3,835,814
[45] Sept. 17, 1974

[54] ROTATING MILKING PLATFORM

[75] Inventors: Leonard D. Jacobs, North Loup, Nebr.; Robert H. Bennett, St. Charles, Ill.

[73] Assignee: Circle Milking, Inc., Jamestown, N. Dak.

[22] Filed: July 14, 1972

[21] Appl. No.: 271,787

[52] U.S. Cl. ............................................. 119/14.04
[51] Int. Cl. ............................................. A01j 05/00
[58] Field of Search ..................... 119/14.04, 52 AF

[56] References Cited
UNITED STATES PATENTS

| | | | |
|---|---|---|---|
| 2,305,259 | 12/1942 | Jeffers, Sr. | 119/14.04 |
| 2,705,474 | 4/1955 | Siciliano | 119/52 AF |
| 2,709,987 | 6/1955 | Bubenzer | 119/52 AF |
| 3,095,854 | 7/1963 | Bott et al. | 119/14.04 |
| 3,097,627 | 7/1963 | Garcia | 119/52 AF X |
| 3,261,323 | 7/1966 | Steelhammer | 119/14.04 |
| 3,709,196 | 1/1973 | Hicks | 119/14.04 |

*Primary Examiner*—James H. Czerwonky
*Attorney, Agent, or Firm*—Dugger, Johnson & Westman

[57] ABSTRACT

The present invention relates to a rotating milking platform for use in a milking parlor wherein the cows move onto a rotating platform, and the cows ride around on the platform while they are milked. A unique drive and support construction for the common friction individual stall portions of the platform which carries the cows is disclosed. The drive compensates for irregularities in the platform. In addition controls for regulating the entry and exit of the cows to and from the platform are provided. Also, means are provided on the platform to cleanse the interior side walls of the parlor as the platform rotates.

20 Claims, 8 Drawing Figures

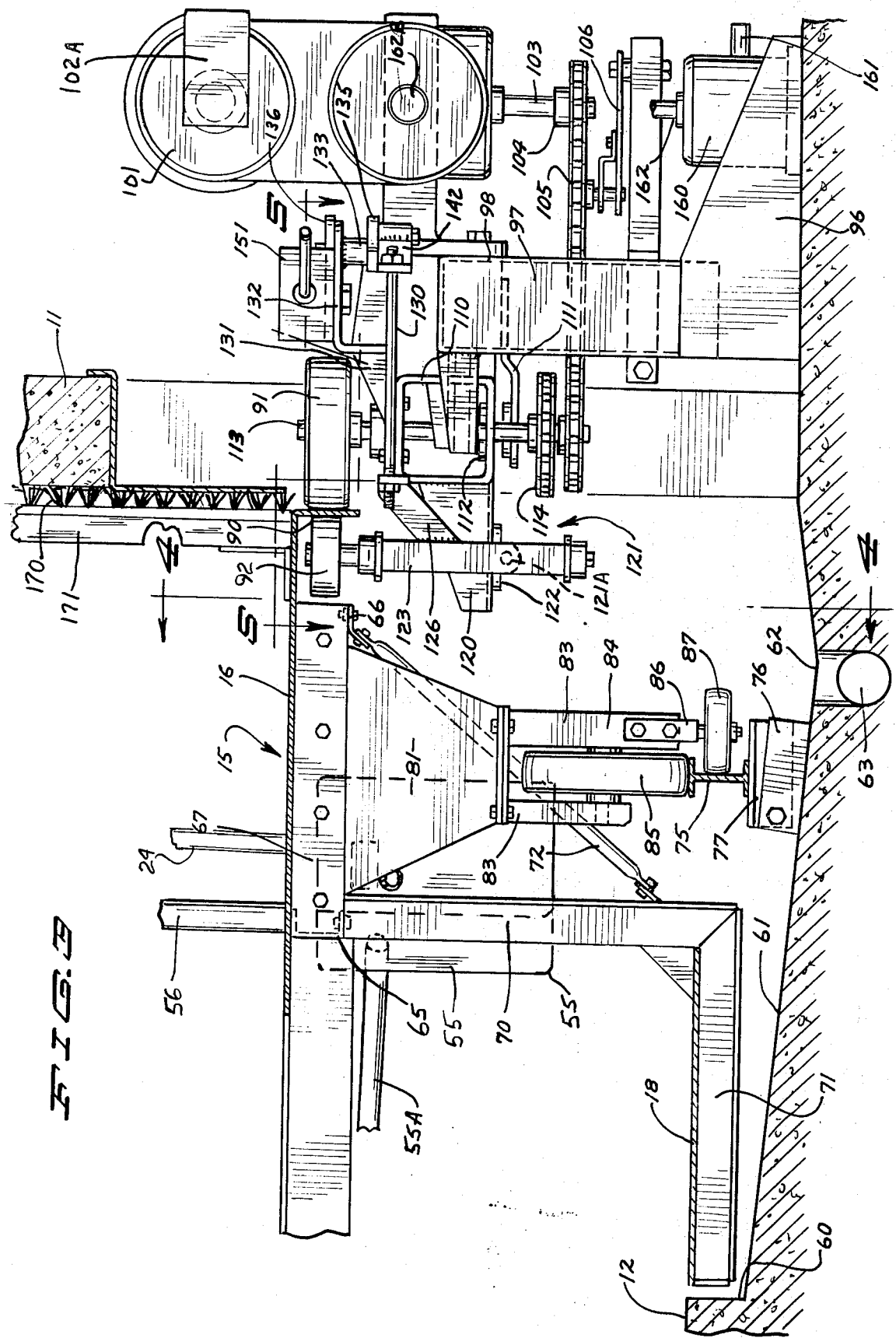

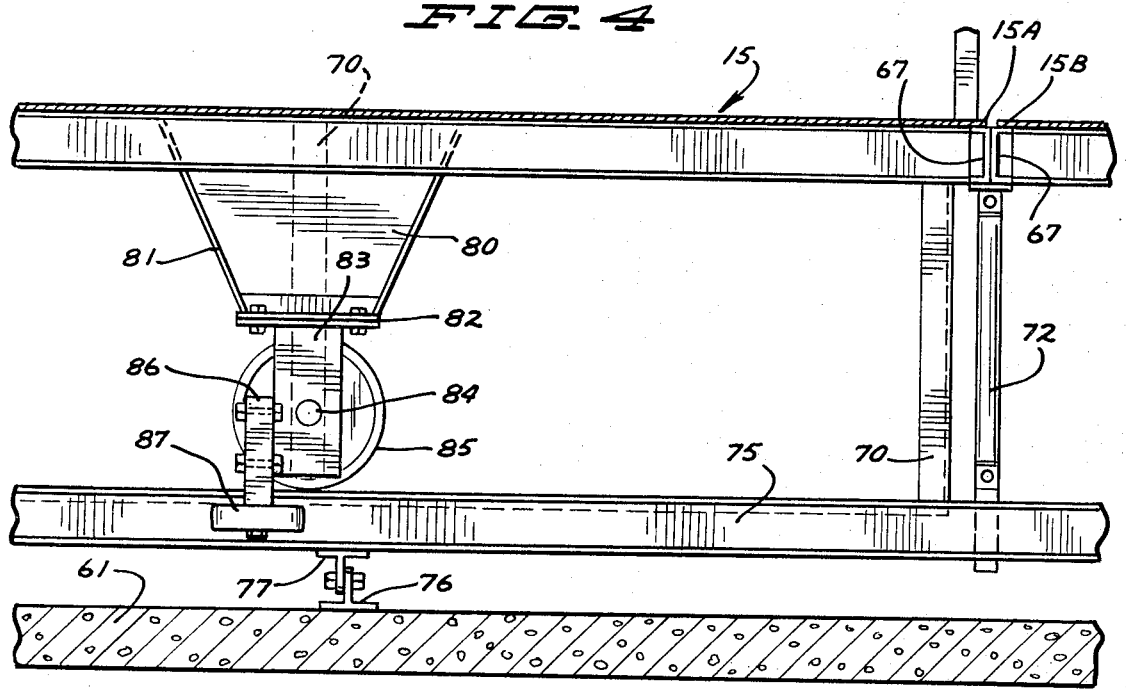
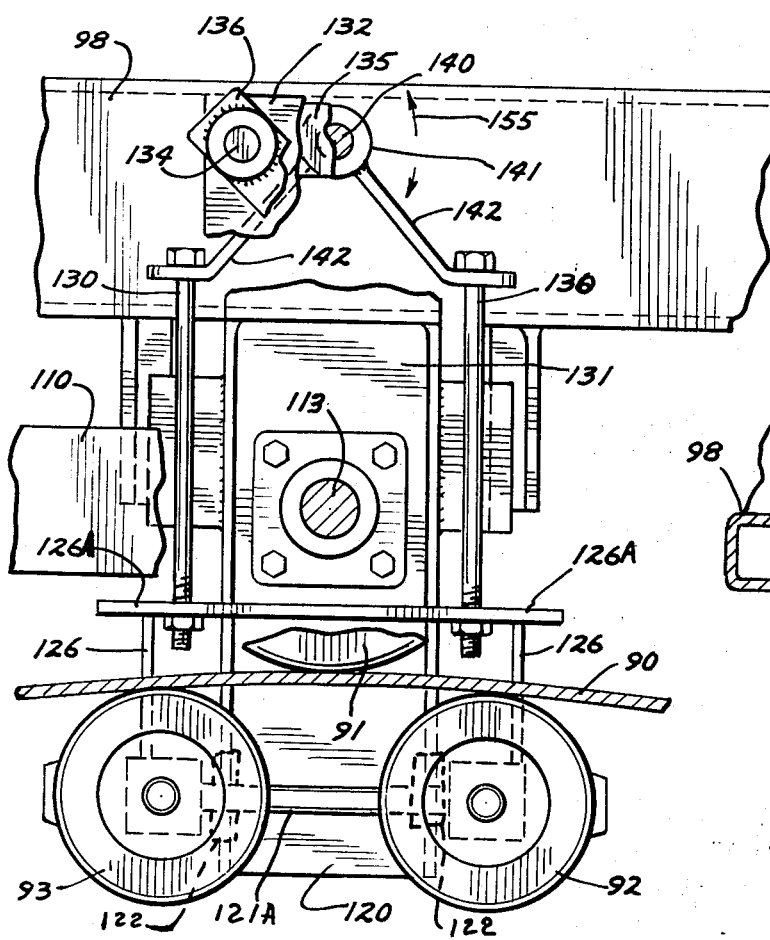
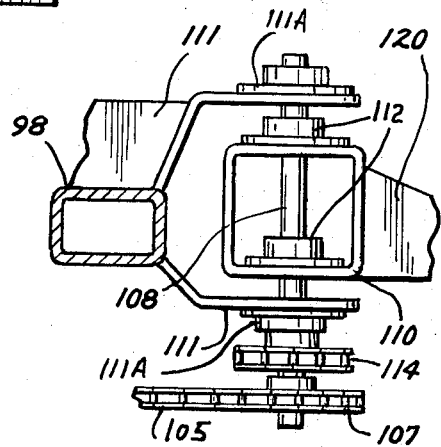

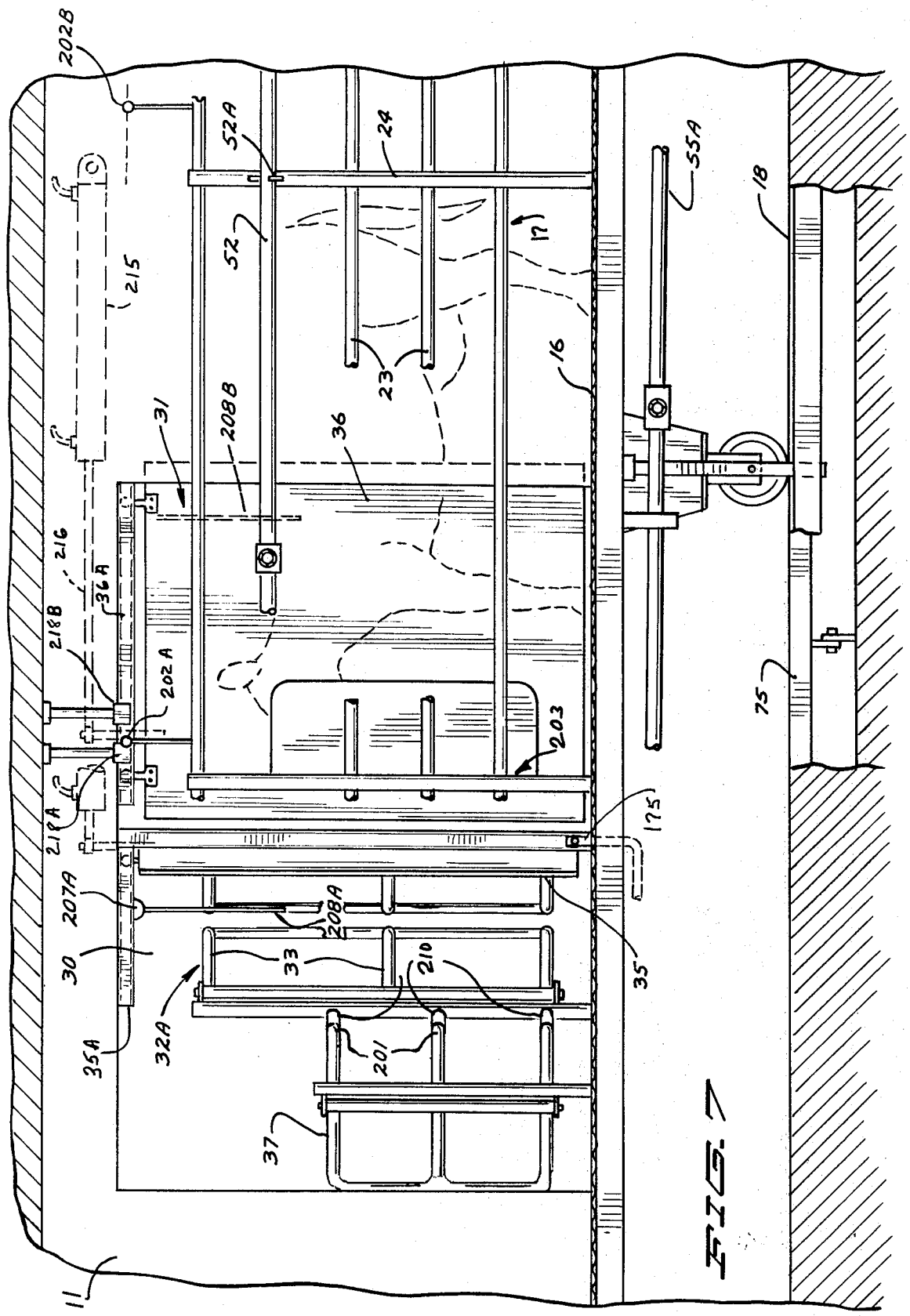

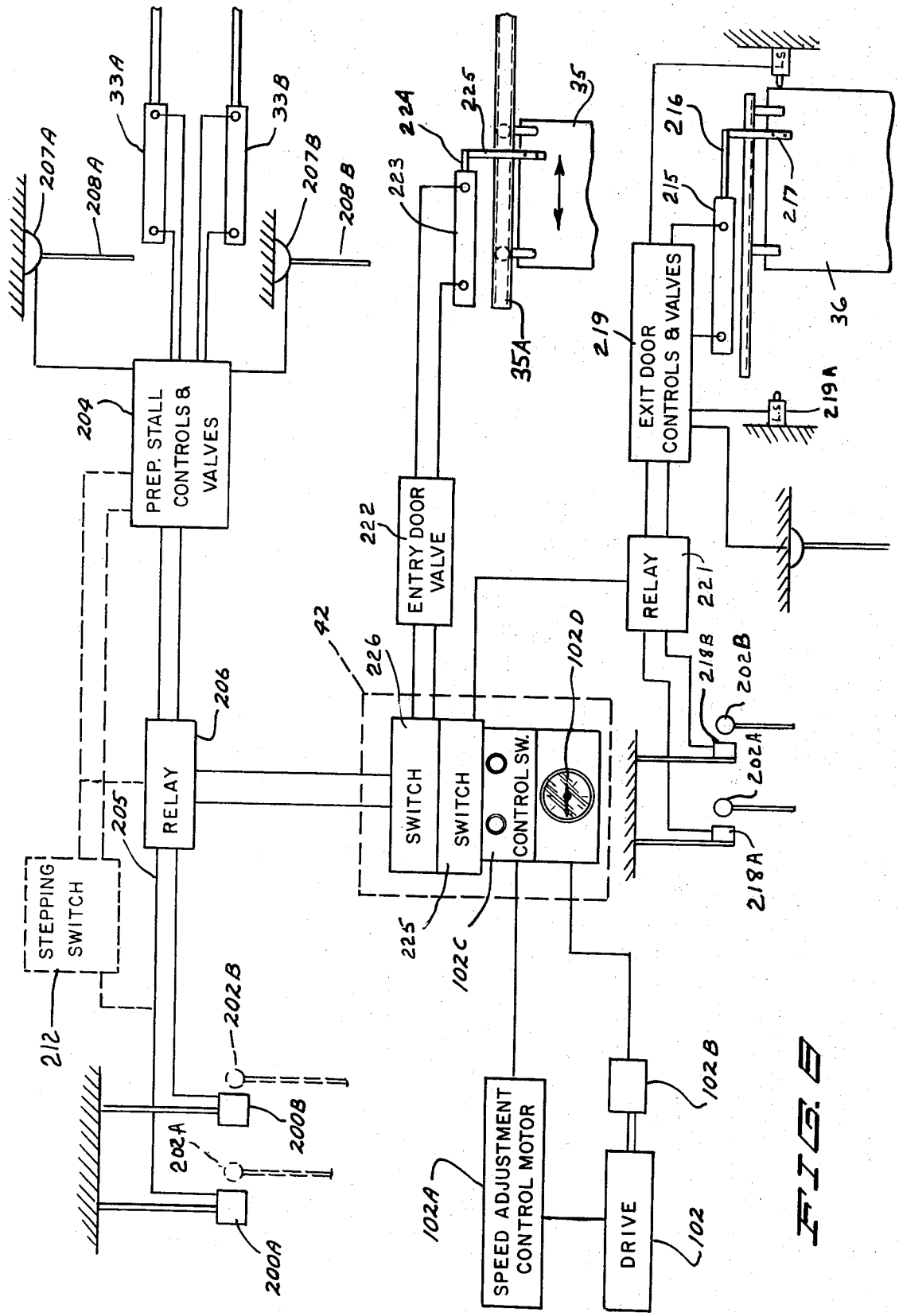

ROTATING MILKING PLATFORM

BACKGROUND OF THE INVENTION

1. Field of the Invention

The present invention relates to rotating milking platforms and specifically to control, drive and support constructions therefore.

2. Prior Art

There have been various milking systems utilizing a rotating platform for transporting the cows in a circle during the milking operation. For example, the Patent to N. E. Darling, U.S. Pat. No. 3,116,713 shows such an arrangement, which utilizes a center post support construction. The U.S. Patent to H. W. Jeffers, Sr. U.S. Pat. No. 2,305,259 also shows a rotating apparatus for milking cows. In this particular patent, the unit is supported for movement on rails and stationary guide wheels.

Another form of a movable platform for milking cows is shown in U.S. Pat. No. 3,095,854 to Bott et al. A gear drive is utilized for driving the unit around, and a stationary rail is provided along which a plurality of radially spaced flanged carriage rollers rotate. The rollers are rotatably mounted on the rotating platform assembly. Another form of rotating milking parlor is shown in U.S. Pat. No. 3,261,323 to P. M. Steelhammer.

These patents all show various constructions, none of which provide for a simple drive mechanism, while giving adequate support and insuring positive drive to the platform.

SUMMARY OF THE INVENTION

The present invention relates to a milking parlor which has a rotating milking platform having a plurality of individual stalls arranged in a circle, and each supported by an individual support pedestal and wheel, and joined to the next stall in a unitized construction.

The platform has an annular band around the periphery used for driving the platform and a unique drive assembly comprising a spring loaded drive wheel that will float along with the band so that accuracy in formation of the platform is not required as it is with a gear drive system. The milking parlor has provisions for preparation stalls for the cows before they enter onto the rotating platform, and also guides for the cows as they exit the platform. The milk lines, vacuum lines and electrical lines are carried through a central rotor or swivel member, and then branch out to the individual stalls.

The platform rotates continuously as the cows enter or exit the platform and the exit gate is controlled automatically to open at the proper time. If the cow is not done milking the operator can manually override the automatic controls and keep the exit door closed and also close the entrance door so the cow goes around again and is milked completely.

The platform unit is made so that it is supported on a concrete floor that is relatively easy to clean, and cleaning devices can be mounted directly onto the rotating turntable if desired in order to scrub the walls of the parlor. The platform also may be flushed with water to keep it clean. The drive unit speed is made adjustable so the operator can vary the speed as desired in order to control the milking rate.

BRIEF DESCRIPTION OF THE DRAWINGS

FIG. 3 is a vertical elevational view showing details of a support platform for the cows, and including an end view of the drive unit of the present invention;

FIG. 4 is a sectional view taken as on line 4—4 in FIG. 3;

FIG. 5 is a sectional view taken as on line 5—5 in FIG. 3;

FIG. 6 is an end view of a support arm of the present invention taken from FIG. 3;

FIG. 7 is a fragmentary side view of the exit and entry area of the milking parlor; and FIG. 8 is a schematic representation of the primary entry and exit controls of the present invention.

DESCRIPTION OF THE PREFERRED EMBODIMENT

Figure 1:
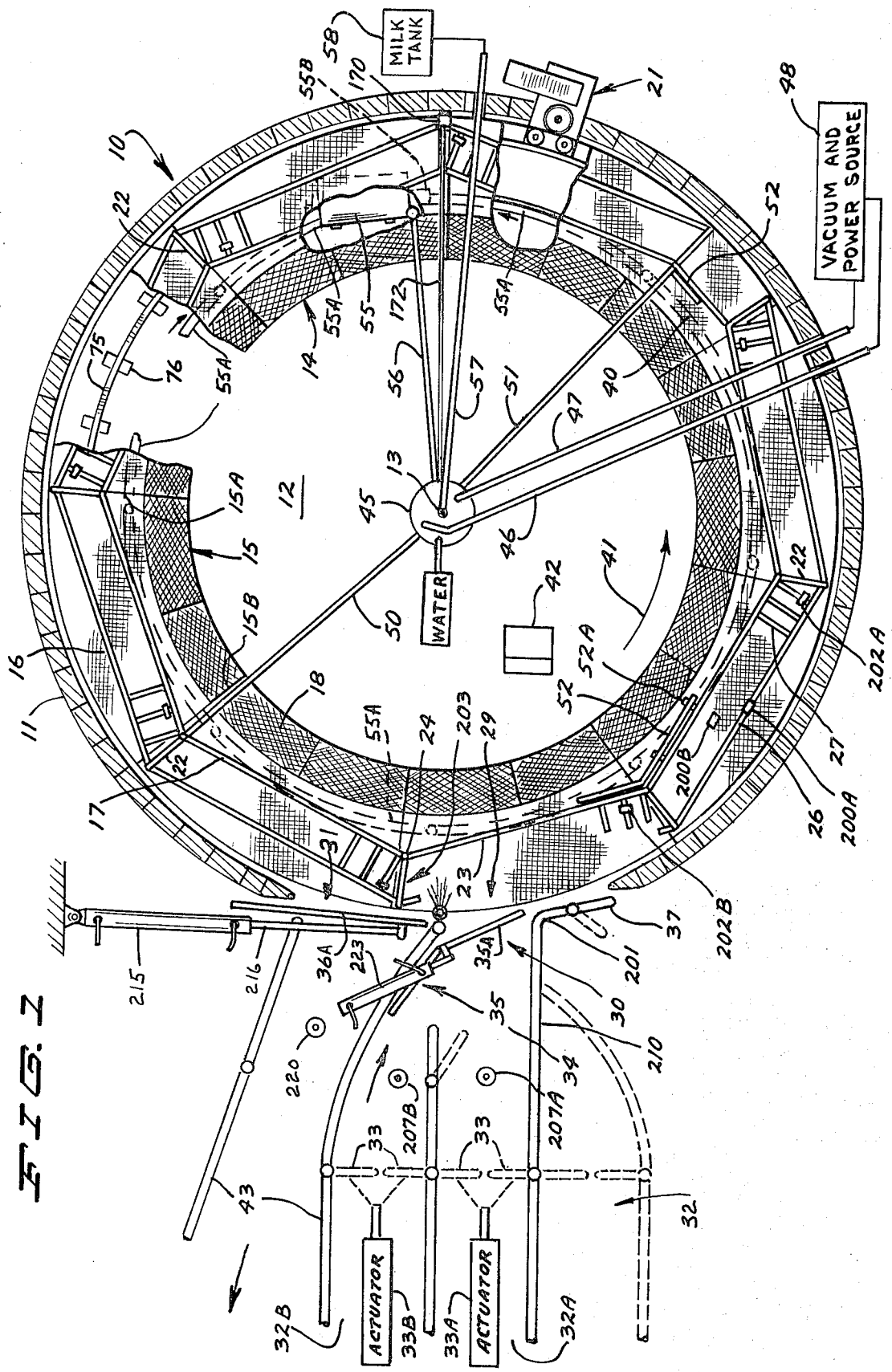
FIG. 1 is a top plan view of a typical milking parlor made according to the present invention.

FIG. 1 is a typical layout of a milking parlor utilizing a rotating cow support platform as shown. The parlor shows one of many different sizes that can be built, and is shown to illustrate the principles of the construction of the invention, in combination with an eight cow milking parlor. The entire milking parlor will be located in a convenient location for the milking operation, and it is constructed to provide for the highest number of milkings with a low capital investment per milking.

The device of the invention has an open center work area in the center portions of the parlor, and also has an operator support walkway that rotates with the turntable or platform so that the operators may ride along with the cows as the milking is progressing in order to perform various tasks that need to be performed. The platform speed is adjustable and the movement is slow enough so the cows can get on or off without stopping the platform.

As an illustrated embodiment the milking parlor is indicated generally at 10, and includes a building having a circular outside wall 11. The wall can be constructed of concrete blocks of sufficient height to clear the upper portions of the cow stalls on the platform, and with a roof over the top. The wall 11 is circular, and mounted on a suitable foundation. Inside the wall 11, the rotating platform assembly is constructed, and the floor is provided with the various areas necessary for operation. For example, a center floor section indicated generally at 12 is provided and this is crowned generally from the center axis indicated at 13. The floor tapers downwardly toward the outer periphery of the house for drainage purposes, and for ease of cleaning. The rotating platform member comprised of a plurality of cow stalls positioned end to end in a circle is indicated generally at 14 and leaves the center floor area open.

The rotating platform member 14 is made up of a plurality of individual cow stall sections which are indicated generally at 15, and the stall sections are joined together at their ends 15A and 15B. An end 15A of each stall section joins with the next adjacent end 15B. Except where provision is made for operator passage across the platform. Each of the stall sections 15 includes a cow support platform generally shown in top view at 16, and a cow stall frame generally shown at 17, made up of suitable pipes. In addition, each of the stall sections includes a supported operator walkway 18.

The entire rotating member 14 is supported for rotation within the wall 11 and also is powered for rotation through the use of power drive unit indicated generally at 21, that is used for driving the rotating member about the central axis 13. The individual stall frames 17 are supported on the platform member 16, and include end dividers 22, vertically spaced side pipe members 23 which form the inside wall of the stall, and upright posts 24 on the ends to support the stall frame. In addition, the stall frame includes an overhead pipe 26 on each of the stalls on the side of the stall adjacent the wall 11. This pipe 26 is joined with suitable cross members 27 to the top pipe on frame side wall 23. However, the side of the stall facing wall 11 below the pipe 26 is unobstructed as shown adjacent the cow entry area indicated generally at 30 where pipe 26 for that stall is broken away, so that the cows can merely move through the open side of the stall underneath the outer pipe 26. The stall is a three sided stall. The inner surface of the wall 11 prevents the cows from stepping off the platform 14 to the outside because of the close proximity of the inner surface of wall 11 to the cow platform.

The wall 11 has a large opening indicated generally at 29, adjacent one side thereof and this includes the cow entry opening 30 where each cow steps onto the cow stall platforms 16 as the platform rotates. In addition, there is a cow exit opening 31 where the cows will move off the rotating platform member 14 after the milking operation is done.

The cow entry opening 30 as shown, leads from two "prep" stalls as shown generally at 32. The prep stalls 32 are side by side, and include first and second stalls 32A, and 32B of suitable design, in which the cows are prepared for milking. This "preping" includes the washing of the cows udders, and in general getting the cow ready for the mechanized milking harvest operation. The individual cow prep stalls 32A and 32B each have a pair of swinging doors 33 at the outlet ends thereof, so that when the cows are ready for milking the actuators 33A or 33B for the doors 33 of the stalls will open and the cows will move out into a walkway 34 and to the entry opening 30 and then will step onto the rotating platform. The gates for the prep stalls 32A and 32B are sequentially opened so that while one cow is getting preped another is moving into the platform. The prep stalls are commercially available units that spray the cows udder with detergent and then rinse with warm water so the cow will let down the milk. The cow is ready to be milked as soon as it steps onto the platform.

A swinging gate 37 may be provided for operator entry. It should be noted that between two of the rotating stalls 15 there is a space on the platform 14 indicated generally at 40, through which the operator can pass. This is between two of the stalls, and the operators can move in and out whenever that space 40 aligns with an opening in the wall 11. Additional operator entry sections can be provided if desired. Operators also can crawl between the pipes of the wall 23 of the stalls because the pipes are spaced vertically from each other.

As shown, the rotating platform rotates in direction as indicated by the arrow 41, and the cows travel in this direction as they are milked, between the entry and exit areas.

The entry opening may be closed with a sliding door 35. The cow exit opening 31 may be closed with a suitable sliding door 36 which is normally closed but is also automatically opened to permit the cows to exit into the exit area defined by rail walls 43. The controls and mode of operation of door 35 and 36 will be explained later. The controls for the unit are mounted on an operator's console 42 in the center work area where an operator has ready access to them.

A rotor or swivel coupling assembly illustrated generally at 45 of any suitable design, can be used for transferring vacuum and electrical power, to the stalls and milking units, and also for transferring milk that has been milked from the cows back into a stationary bulk milk tank. The rotor is in effect a slip ring unit for the vacuum lines and liquid lines which has one element that does not rotate and one element that rotates with the platform. For example, vacuum lines 46 and 47 extend between the swivel and a stationary vacuum source 48. Vacuum lines 50 and 51, extend from the swivel (the movable portion) to the annular platform and typically a vacuum line 52 is suspended on suitable brackets 52A from the inner walls of the stalls 15 and extends around the periphery of the milking unit around the inside stall wall 23 so that the vacuum is supplied to each of the stalls for operating milkers of usual design.

The milk from the milker unit is drained through suitable lines to a milk transfer tank 55 mounted on platform 14 and that has a suitable pump thereon 55B and this pump can be operated to pump the milk through a line 56 to the swivel 45, and then back out through a line 57 to a bulk milk tank 58 for further processing of the milk. The bulk milk tank 58 can be in another building completely separated from the milking parlor.

The milk tank 55 is mounted on the platform assembly 14 and milk is fed under gravity from the individual milking units through pipe 55A which extends all the way around the platform 14 and is on an incline from a point diametrically opposite from the tank 55 and then drains to, and enters the tank 55 from both ends (see FIG. 1). The pipe 55A is suspended below the platform members 14. Suitable connections for connecting the milking units (there are eight milking units, one for each stall) to the pipe 55A are provided. The transfer tank 55 and pipe 55A rotate with the platform and the tank is emptied by running the pump 55B provided, to pump milk out lines 56 and 57 to bulk tank 58. The swivel connection for the milk lines is in the center of the swivel 45 and can be of any desired design. Power for the pump 55B can be provided through the swivel with slip ring connections. The tank 55 is suspended from the platform 14 on suitable brackets.

The swivel 45 is supported from the roof of the parlor or in any other desired manner and is a swivel that transfers fluid from the stationary upper member to a lower member that rotates with the platform 14. The branch lines, both stationary and rotating, which extend from the swivel are all overhead and clear of the operator. Suitable upwardly extending line portions can be used adjacent the stalls to give sufficient head room for the rotating branch lines.

Electrical power for use in the central area 12 also may be carried through the swivel, if desired, but of course power to stationary units may be provided through conduits in the floor.

Each of the individual cow platforms 16 and the associated stall and operator's walkway section are supported on an annular track, which will be explained by reference first to FIGS. 1 and 3.

The center area 12 of the milking parlor is shown in FIG. 3, and it can be seen that where the operator walkway 18 moves the floor drops with a sharp shoulder 60 into a sloping radially outwardly extending section 61 that extends like an annular trough around the parlor. The sloping section 61 also forms a drain channel that slopes down to the low annular area 62 in which floor drains 63 may be provided at suitable intervals. The slope of the floor is such that it can be easily cleaned and flushed clean. The upper surface of the center portion 12 and the upper surface of the operators walkway 18 are aligned so that the operator can step on and off the walkway as desired to continue the milking operation.

The individual stall units 15 are made with suitable curved support members 65 and 66 (see FIG. 3) which extend along the length of the stall units, and which are joined together with suitable cross members 67. In addition, the operators walkways 18 are mounted on suitable supports 70 which depend from the frame 65-66-67 and which have a right angle outwardly extending portion 71 on which the walkway platform portions are mounted. The individual cow platforms 16 are fixed onto the support members 65-66-67 in a suitable manner, and the upright posts 24 are mounted in a suitable location for giving of sufficient width between the wall 11 and the pipes 23 forming wall 17 of the stalls. Support braces 72 are connected from the outer longitudinal support 66 to the upright supports 70 for the walkway to provide adequate strength.

An annular track 75 (see FIG. 1 as well) is mounted on the low portion of the floor 61, on suitable support brackets 76 that are spaced at suitable locations. A second bracket 77 is attached to each bracket 66 and they are adjusted so that the upper surface of the track 75 is parallel to the plane of rotation of the turntable. The tracks 75 as shown can be I beam sections that are formed in a circle and that are joined together in a suitable manner with tie plates or the like. The track 75 is a continuous circular track extending around the interior of the milking parlor. Each of the individual stall sections 15 is supported on a separate pedestal and wheel with respect to the track.

Referring to FIGS. 3 and 4, a typical pedestal is illustrated at 80. Pedestal 80 is mounted with suitable brackets between the members 65 and 66, and cross member 67 and also is directly supported on the cow platform 16 for that particular segment of the rotating member. The pedestal 80 comprises an inverted pyramid shaped unit which has at least one side wall and a pair of end walls extending from the cow platform. This pyramid shaped unit is indicated generally at 81, and terminates along a lower support bracket 82. The bracket 82 in turn has a pair of depending support members 83, 83 attached thereto with an axle 84 extending between the support members and supporting rotatably mounted wheel and tire 85. The tire rides on top of the top flange of the track 75 and is supported on the track. The tire and wheel 85 roll along the track as the rotatable platform rotates. In addition, the support 84 includes a bracket 86 that has a wheel and tire assembly 87 that rotates about an upright axis and which engages the web of the track 75 on the outside surface thereof to keep the wheel 85 from slipping off to the inside of the track 75. In practice, only every other support 84 requires a guide tire 85. The platform is designed so that when it is loaded the wheels and tires 85 do not tend to fall off the track to the outside. If additional guide wheels 87 are needed, they can be placed so that they run against the inside of the flange on track 75 for guidance.

The platform is thus independently supported on the track 75, and because it is an annular member and rigidly held together, the wheels 87 on the outside of the track tends to keep the supports from spreading apart and sliding off the tracks. Because the platform is independently supported for rotation on the track 75, there is no need for guides or other mechanism in the center areas of the parlor.

Figure 2:
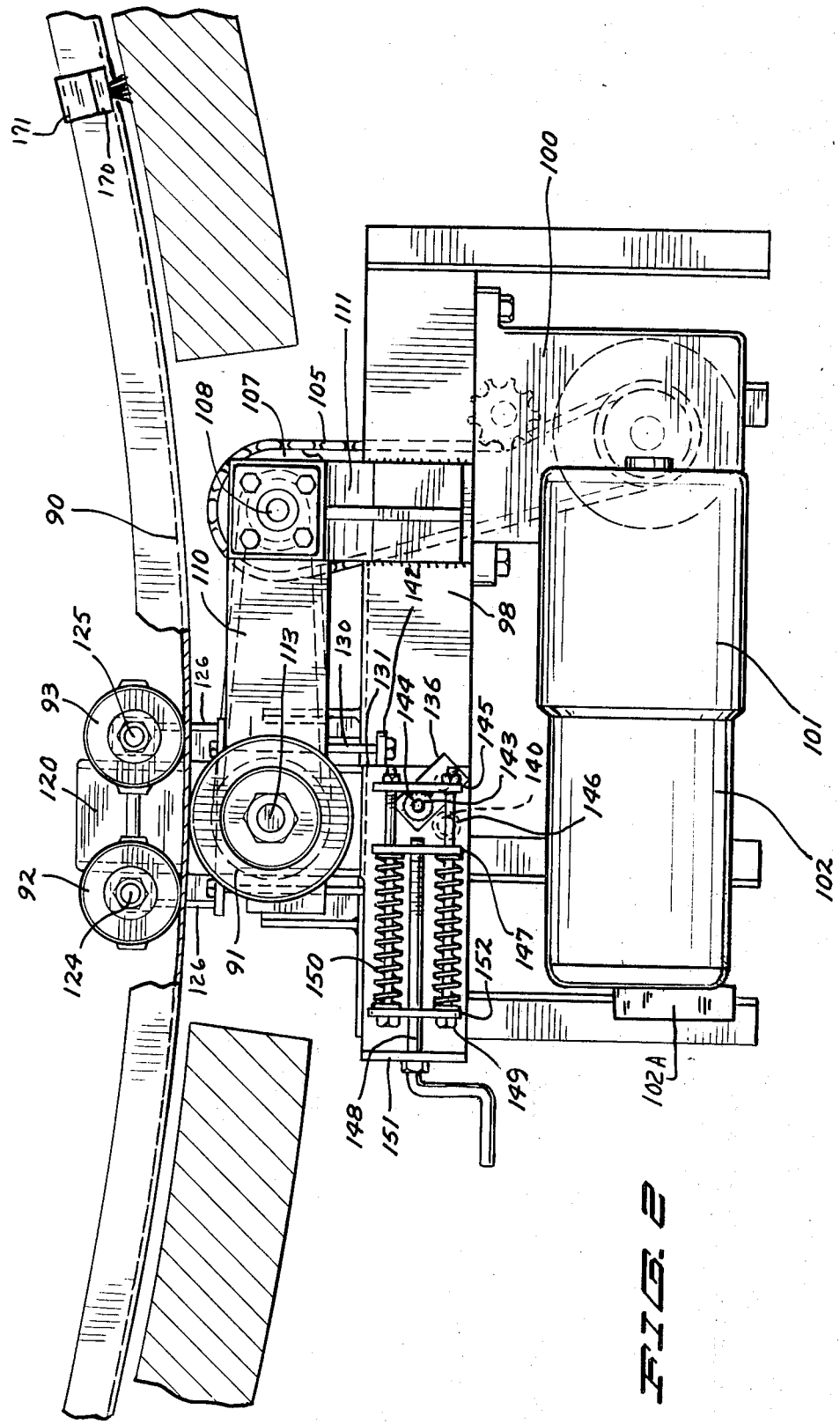
FIG. 2 is an enlarged top plan view of a portion of the cow support platform and the drive unit used with the present invention.

In the past, attempts have been made to use gear drives for rotating milking platforms, or large chains or similar devices have been used for driving. However, the movement of the unit and manufacturing tolerance make it difficult at times to have sufficiently accurate manufacture for gear drive set-ups. The present device has a unique drive structure for the platform. Referring to FIGS. 2 and 3, as well as to FIG. 5, the cow platforms 16, which can be of ordinary steel plate material, have a downwardly depending band illustrated generally at 90 attached thereto. This band 90 is a continuous band that goes all the way around the rotating unit 14, and is joined in a suitable manner at the junctions of the individual stall sections 15 without increasing the thickness of the band. For example, band sections can be welded together and then smoothed off so that a continuous annular band 90 extends around the rotating member.

This band 90 then is frictionally driven in the present invention through the use of the drive assembly 21 as previously shown. The drive assembly 21 includes a drive wheel 91 that is on the outside of the band 90 and which frictionally engages the outer surface of the band 90. A pair of spring loaded idler wheels 92 and 93 are on the inner surface of the band and coupled to the drive wheel 91 to exert a spring force to urge the drive wheel against the outer surface of band 90.

The drive unit 21 includes a base support member 96, which supports upright members 97. The upright end members 97 support a cross frame member 98 that extends laterally between these upright members (see FIG. 2) and provides one of the main supports for the entire drive unit. Suitable brackets on cross member 98 are used for supporting a right angle drive gear box 100, that is that driven from an electric motor 101 through a variable speed drive 102. The gear box 100 may be an integral unit with the motor and variable speed drive, so that it can be mounted as a unit on the frame cross member 98. The output shaft 103 of the gear box, has a sprocket 104 drivably mounted thereon and this in turn drives a chain 105. Suitable spring loaded idlers 106 can be used for the chain 105, to keep it under proper tension.

The chain 105 in turn drives a sprocket 107 (see FIG. 6) that is drivably mounted onto a drive shaft 108. The drive shaft 108 extends through suitable bearings that not only mount the shaft 108, but also mount a swinging arm assembly 110 on the shaft. The arm assembly 110 is supported between upper and lower brackets 111 which are attached to the cross member 98 and which carry bearings 111A that mount shaft 108. The shaft 108 is rotatably mounted with respect to these brackets 111, so that it can be driven for rotation, and the arm 110 also has suitable bearings 112 attached thereto and mounted on the shaft 108 to permit the arm 110 to swing about the axis of shaft 108 with respect to the cross member 98.

The outer end of the arm 110 has suitable bearings mounted thereon which in turn mount a shaft 113 for the drive wheel 91. The shaft 113 extends downwardly and below the arm 110 and is driven by a sprocket and chain assembly 114. The drive sprocket for the chain assembly 114 also is driven from shaft 108 (see FIG. 6). Thus the drive to the wheel 91 is through the pivot shaft 108 which permits the arm 110 to swing in and out with respect to the cross member 98, at the same time that the wheel 91 is rotationally driven under power.

The back up wheels 92 and 93 are mounted for movement with the arm 110. Referring to FIGS. 2, 3, and 5 the arm 110 has a laterally extending guide bracket 120 fixed thereto and extending outwardly therefrom. A pressure wheel support assembly 121 is pivotally mounted to the bracket 120 with a shaft 121A so the upper portion of wheel support 121 may move toward and away from the wheel 91. Bearings 122 attached to member 120 hold the shaft in position and the shaft 121A moves with the wheel support assembly 121.

The wheel support assembly comprises a pair of spaced upright support tubes 123 on which bearings are mounted for supporting the shafts 124 and 125 that are used for mounting the wheels 92 and 93. The wheels 92 and 93 are idler wheels, so the shafts 124 and 125 are free to rotate in their bearing supports.

The wheel support 121 is spring loaded toward the drive wheel 91 through a crank arm arrangement, that uses a pair of springs that move also with the arm 110. As shown, the wheel support assembly 121 has a pair of brackets 126 that extend toward the arm 110 and these brackets 126 are joined by a cross member 126A that in turn mounts a pair of long bolts 130. The bolts 130 are spaced apart, and as shown slidably pass over the upper surface of the arm 110 (see FIG. 3). The arm 110 also carries a spring member support bracket 131 which is fixed to and moves with the arm 110, and is positioned above the cross member 97. The spring support bracket 131 includes a horizontal support plate 132 and a hub 133 fixed to and depending from plate 132. The hub 133 in turn rotatably mounts a crankshaft assembly 134 which has a pin rotatably mounted in hub 133 and a first actuator arm 135 fixed to the pin and positioned below the plate and hub 133, and a second actuator arm 136 fixed to the pin and positioned above the hub 133 and plate 132. The actuator arm 135 which is below the hub 133 has a crank pin 140 mounted on the outer end thereof. This pin 140 in turn rotatably mounts a hub 141 that has a pair of legs 142 fixed thereto and extending therefrom as shown in FIG. 5, and these legs 142 are used for slidably mounting the opposite ends of the bolts or rods 130 from the bracket cross member 126A.

The upper actuator arm 136, as shown in FIG. 2, has a crank pin 143 thereon which is mounted in a hub 144 that is in turn attached fixedly to a spring bracket 145.

The spring bracket comprises a flat plate member with two openings into which spring bolts 146, 146 are slidably mounted but which are retained by nuts on the bolts. These bolts 146, 146 in turn slidably pass through provided side openings in an adjustment plate 147 which has a threaded center opening into which a threaded end of a crank 148 is threadably mounted. The ends of the bolts 146 have heads 149 thereon that hold a spring retainer bracket 152 on the bolts and the springs 150 are thereby retained on the bolts. The crank 148 in turn rotatably passes through an upright plate 151 fixedly mounted on the bracket 132, and the crank also rotatably passes through a center opening in spring retainer 152. Upon turning the crank 148, the threaded end of the crank moves the adjusting plate 147 to tighten or loosen the springs 150 and change the force exerted by the springs.

The tension on the springs 150 acting through the plate 152 and bolts 146 against the member 145 causes the hub 136 to tend to rotate about the axis of the main pin of crankshaft 134 which is mounted in hub 133. This force in turn will tend to force the arm 135 to rotate about the axis of the crankshaft pin in hub 133. The spring force acting through arm 135 and hub 141 therefore forces the bracket 142 to tend to move in direction as indicated by the arrow 155 (see FIG. 5). The bolts 130 are thereby spring loaded to move the brackets 126 toward the arm 110, and to pull the upper end of wheel support assembly 121 toward the arm 110. With the drive band 90 trapped between the wheels 92 and 93 and the drive wheel 91, the spring force causes a clamping action. The force with which the wheels 92 and 93 bear against the band 90 is determined by the amount of force in the springs 150. Each time the band comes to an irregularity, the springs of the wheels 92 and 93 can move slightly. This will cause the brackets 126 to pivot to increase the spring load dut to the pivoting of the crankarm 135 and arm 136, which acts against the spring load from springs 150.

The entire arm 110, and everything supported on the arm 110, including the drive wheel 91, and the spring loaded idler wheels 92 and 93 as well as the spring loading assembly mounted on bracket 131 are free to move about the axis of shaft 108 to provide for transverse movement of the band 90 as the unit is driven. This permits the band 90 to be less than perfect in its circularity, and insures that the drive wheel will follow along without causing undue stresses or causing breakage.

The drive wheel 91 can be coated with a suitable polyurethane coating, as can the idler wheels 92 and 93 to insure that an adequate friction drive is achieved between the metal band 90 and these wheel surfaces.

For a standby power supply, a gear box 160 can be provided on the stand 96, and have an input shaft 161 and an output shaft 162. The input shaft can be connected to the power takeoff of a tractor or the suitable power source and the output shaft 162 can be used for driving the chain 105 to drive the unit if in case of a power failure.

The drive unit is mounted in a convenient location for servicing and as shown, can extend through an opening in wall 11.

It is important that the drive unit frictionally drives the rotating platform so that the platform can slip if the cow becomes jammed in either the entry or exit gate areas. If a cow becomes caught between one of the stalls and the edges of the walls, the drive member will slip without killing the cow. In positive drive units, injury and actual death have resulted when a cow is caught in between a stall and the edges of the entry or exit openings. However, with the present friction drive mechanism, the drive will slip before the cow is seriously injured, and this then will permit the operator to stop the unit, and reverse it, if necessary to release the cow. Therefore, the friction drive mechanism provides a safety factor for protecting the cows against injury adjacent the entry and exit areas of the unit.

The variable speed drive for the platform is of great importance in operation of the milking system in that it permits the operator to adjust the speed of rotation of the platform from the control console 42 while the platform is rotating so that the speed of rotation can be changed if the milking process is going slowly. While the milking system is set up so that the prep stalls 32 generally have the cow already for milk harvest, sometimes, particularly when first training a herd for the rotating milking parlor, a cow will be slow to milk, or the average milking time of the cows will be slow or some other abnormality will develop. Then the operator can slow down the platform so that most of the cows, at least, are finished milking in one revolution of the platform.

The speed adjusting device is part of the drive unit of the variable speed drive 102. This unit is purchased from the Reeves Manufacturing Company. The variable speed drive 102 comprises a pair of pulleys that are adjustable in diameter, in a conventional manner as commonly sold on the "Reeves" variable speed drive units. The adjustment is accomplished in this particular model with an electric motor drive indicated at 102A, and the output pulley of the variable drive has a tachometer generator 102B attached thereto which delivers a signal indicative of the speed of the output shaft of the variable drive unit 102 which drives the gear box 100. This tachometer generator 102B can be used for driving a suitable speed indicator meter on the control console 42. Electric motor 102A which is reversible and can be powered to either increase or decrease the output speed of the unit can also be operated from the control console by pushing a switch indicated at 102D on FIG. 8. Also on FIG. 8 the variable drive unit is shown in schematic form with the control switch 102D on the operators console 42, which is a double push button control switch one button of which the operator holds down to power the speed adjust control motor 102A in the desired direction and which will change the output speed of the drive unit 102 relative to its input speed. Thus the operator can adjust the output speed to a desired level, and by use of the indicator meter 102C can readjust the speed back to a desired speed if he once slows the platform down for any reason, such as for the admittance of a relatively new cow to the milking sequence.

Thus the important feature of the speed adjustment is accomplished by use of the variable speed drive 102 which is purchased from the Reeves Manufacturing Company. The operator does not have to stop the table if problems arise, but only slow the platform down.

The platform is made so that it rotates a complete revolution from the entry to the exit areas in approximately 4-½ to 5 minutes after the cows are accustomed to it, and the speed is such that a cow can step on or off while the platform continues to rotate. There is no need to stop the platform to admit the cow or let her leave.

A platform can of course be stopped by controls from console 42, such as an on off switch for the motor 101.

The parlor walls may be continually washed and scrubbed during each cycle by mounting an upright brush 170 on the platform. The brush is mounted on an upright member 171 and may be spring loaded against wall 11. The bristles engage the wall as the platform rotates. A small water line 172, which is connected to a water source through the swivel 45 discharges a small amount of water down along the brush 170 which scrubs the walls as the platform rotates so the walls are cleaned. The brush extends for the full height of the walls and down to the cow platform level.

The brush 170 is made of suitable tough material and is mounted at one stall junction. The scrubbing action is continuous as the platform rotates. The water used is only a small quantity and this drains out through the provided drains in the floor. The continuous scrubbing insures that the parlor walls are kept clean without stopping the milking operation. The water for scrubbing the wall may be provided by mounting a tube on the wall that dribbles water onto the wall. The platform member 16 also may be flushed with water from a pipe 175 that is mounted between the entry and exit areas. The flow of water from pipe 175 flushes materials from the platform into the drain area.

The prep stalls 32A and 32B have been explained only briefly, and while only two prep stalls are shown in parallel arrangement, it is to be understood that additional prep stalls can be shown as well, and a dotted line showing of a third prep stall is also included in FIG. 1. These can be four, five or more prep stalls depending on how large the turntable is. While an eight cow rotating unit is shown, and two prep stalls work for an eight cow unit, it also could be used with three prep stalls to perhaps speed up the milking operation a little more. If a twelve cow platform is used, it will be necessary to have at least three prep stalls, and perhaps five prep stalls are needed where an 18 cow unit is being used. In any event, it was briefly mentioned that the cows will be sequenced out of the prep stalls onto the rotating platform. First, reference will be made again to FIG. 1, it can be seen that the swinging doors 33 for the prep stalls 32A and 32B respectively are operated with actuators 33A and 33B, respectively. The prep stalls actuators and linkages for connecting the actuators to the stall itself are well known in the art, and the prep stalls themselves are made by Babson Bros. Co. Oakbrook, Illinois. The controls are included in the purchased prep stalls and once the actuators close the doors, the prep stall washing cycle will be initiated. In the present device, the control switch for the actuators for opening the swinging doors 33 are mounted outside of the normal prep stall controls and are positioned to be actuated by the rotating platform when a stall is properly positioned relative to the entry opening 30. This is done with suitable stall position sensors, and in the particular form shown, magnetically actuated switches mounted with respect to the ceiling of the milking parlor 10 are used, and suitable magnets carried by each of the cow stalls on the rotating platform are positioned so that they will actuate the proper magnetic switch to open the gates of the prep stalls in sequence, first stall 32A and then stall 32B, alternately. In FIG. 1, a first magnetic switch 200A is shown positioned closely adjacent the wall 11, and is offset in the direction of rotation of platform from the entrance opening 30 a specific amount so that the actuator 33A will be actuated when the front or leading end of the empty stall will be approximately even with the guide corner indicated at 201 of the side wall for the holding area 34. The rotating stalls 15 are each provided with a small magnet mounted on an arm, as perhaps can be seen in FIG. 7, and also which are shown in FIG. 1, and these magnets are positioned so that they will align with the appropriate magnetic switch 200A or 200B for a prep stall opening signal. For example, in FIG. 1, the magnet 202B on the stall 15 which has passed the entrance opening 30 will align with the magnetic switch 200B after the platform is rotated a short distance from the position shown. The leading end of the stall 15 that is indicated at 203 adjacent the entry opening will be approximately even with the corner 201 of the entrance opening 30 when the magnet 202B aligns with the magnetic switch 200B. This alignment of the magnet 202B with the switch 200B will trip the switch and cause the switch 200B to operate through a suitable control line 205A through contacts of a normally closed relay 206 to the prep stall controls indicated schematically at 204 (see FIG. 8) to actuate the actuator 33B and open the gate 33 for the prep stall 32B so that the cow will come through the passageway and into the opening 30 and step onto the platform 16 for the aligned empty stall. The actuators 33A and 33B are pneumatic cylinders that are controlled by suitable valves and operated to open when the respective switches 200A or 200B are tripped.

Alternate stalls 15 carry magnets 202A which are positioned to be aligned with the magnetic switch 200A at the proper time so that when the next succeeding stall rotates to position, the magnet 202A will operate the magnetic switch 200A to send a signal along the line 205B through normally closed relay 206 to the prep stall controls and valves 204 to actuate the actuator 33A for the prep stall 32A so that the cow that was in the prep stall 32A will then be released to come out through the openings 30 onto the proper rotating stall 15 as the platform rotates. The prep stalls are thus alternately opened so that while one of the cows is being washed and prepped, the other cow is moving onto the platform and another is moving into the empty prep stall to keep up the movement of cows onto the rotating milking platform. It is also been assumed that the door 35 for the entry opening 30 has been continuously open during the opening of the prep stall gates 33 to admit new cows onto the rotating platform, and this is the usual situation. The operation for closing the door 35 for the entrance opening 30 and the reasons for doing so will be more fully explained.

In the alleys leading from each of the stalls 32A or 32B a separate switch is mounted that is used for closing the respective exit gates 33 for the particular prep stall. The switches are mounted on the ceiling, and have depending flexible wands. A typical type switch is shown in FIG. 7, and also these switches are shown schematically in FIG. 8. The depending wand is a flexible member that will be contacted by the cow as the cow comes through the alley underneath the switch. The wand deflects to close the switch. The switch is used for operating the valves for actuators 33A or 33B respectively to close the respective doors. For example, there is a switch 207A that is mounted in the alley directly ahead of the prep stall 32A so that the cow coming out of the prep stall 32A will strike the wand 208A and actuate the switch, and then through the prep stall controls 204, energize the solenoid valve to actuate the actuator 33A to its closed position and close the exit gates 33 for the prep stall 32A. The switch moves to its closed position when the cow moves away, but the prep stall controls hold the valves "on" until the doors 33 close, and then the valves may be disabled by a limit switch that indicates closing of the doors. Another unmilked cow will then move into the prep stall 32A.

Likewise, a switch 207B having a depending wand 208B is mounted in the alley directly ahead of the prep stall 32B and the wand 208B is positioned so that a cow coming out of the prep stall 32B will strike the wand 208B causing the switch 207B to be actuated and through the prep stall controls and valves 204 to close the gates 33 for prep stall 32B by operating the actuator 33B.

Again, the controls and valves for the prep stalls are commercially available from Babson Bros. Co. of Oakbrook, Illinois, and the wand type switches are used with the conventional prep stalls. One difference in this particular instance is the use of the magnetic switches or other sensing devices inside the milking parlor to determine when a stall is properly positioned with respect to the entry opening so that the prep stalls gate will be opened to let a cow out and permit her to move onto the rotating platform.

It should be noted that the entry opening 30 is relatively narrow, on the order of 30 inches wide, and the guide wall 210 leading toward prep stall 32A from the corner 201 is approximately normal to a tangent line at the edge of the rotating platform so that when a cow comes through the opening 30, she has to make a sharp turn to get into the head end of the stall (the controls are timed so that the front of the stall, for example the front end indicated at 203, will have moved past the corner 201 of the opening by the time the cow gets there), so that she will swing her rear quarters toward the pipes 23 which form the inner wall of the rotating stall so that the cow will immediately be in position where the milking units can be attached by an operator and the milk harvest can commence immediately. The cow has already been prepped, and her milk has been induced to be let down by the warm water of the prep stall 32A or 32B, so that the milking can commence immediately. This speeds up the overall operation. Thus the use of a guide wall 210 (which is made of three vertically spaced, horizontally extending pipes) that is substantially on a radial line from the rounded corner 201, which forms a narrow opening, guides the cow so that she has to turn a sharp corner as the comes onto the platform to put her rear quarters adjacent the inner wall pipes 23 of the rotating stall so that she is in position for an operator on the platform or walkway 18 to reach her.

The entry door 35 is normally kept open, and the cows can be sequenced out of the prep stalls as desired. As will be explained later, if a cow is held on the rotating platform for more than one revolution because she isn't fully milked, the door 35 will be closed, and the sequencing of the prep stalls will be interrupted. However, in the normal situation this does not occur, and of course is kept to a minimum in order to prevent delays in the milking operation.

If additional prep stalls 32 are utilized as shown in dotted lines, the sequencing can be controlled merely by using a stepping switch illustrated in dotted lines in FIG. 8, at 212. The stepping switch is connected to only one of the magnetic switches, for example switch 200A, which would be excited by magnet 202A. All the stalls 15 on the platform would have magnets in the same position as magnets 202A. The stepping switch would then in sequence activate the prep stall controls and valves for each of the prep stalls sequentially. The relay 206 would be kept in circuit for purposes that will be explained.

The exit door 36 is slidably mounted on a track 36A of usual design, and is controlled for opening and closing through the use of a pneumatic actuator 215, which is a pneumatic cylinder-piston arrangement having an extendable rod 216 that is attached to a bracket 217 leading to the sliding door 36. The extention or retraction of the rod 216 causes the door 36 to roll along the track 36A to either an open or closed position. This door 36 is normally maintained in a closed position so that when a cow in a rotating stall 15 moving toward the exit opening 31 will see only the closed door and not an opening and will not get excited or nervous and try to move out too quickly. The door 36 is held closed normally, as shown in FIG. 7, until the proper time. The control of the door 36 is also done as shown with a magnetic switch arrangement, that operates through suitable solenoid valves and other controls for the actuator as is necessary, including relays to control operation properly.

For example, referring to FIG. 7, the magnetic switch 218A which is in position to be activated by the magnets 202A is placed so that when the magnet 202A on a particular stall, for example the stall having the forward end indicated at 203 comes adjacent the magnetic switch 218A, the switch 218A is energized and this will in turn activate a suitable solenoid valve and relay control 219 to retract the rod 216 of actuator 215 and open the door 36 so that the cow can step off the platform through exit opening 30 and go out the exit alley. It can be seen that the forward portion of the stall is almost abreast of the far side of the exit opening before the door 36 opens so that the cow in this stall can exit immediately as soon as the door 36 opens. The door 36 is retained opened. The valve for the actuator 215 may be moved to a neutral position by a limit switch 219A acting through the controls 219. A wand switch 220 positioned in the exit area alleyway is contacted by the exiting cow to energize the controls and valves 219 and close the exit door 36 once again. This is done after the cow is fully through the door opening. Then, when the empty stall moves into the entry area, the magnet on the stall 15 ahead of the empty stall will trip the appropriate magnetic switch 200A or 200B, and a cow exiting from the prep stall which was opened will go into the empty rotating stall 15. A magnetic switch 218B is used in combination with magnets 202B to also open the exit door when the next stall 15 is properly positioned.

In the operation of the rotating milking parlor it is sometimes necessary to keep a cow on the rotating platform for longer than one complete revolution because the milking is not completed when the cow gets around once. The platform could be stopped, but this is time consuming and also upsets the cows. In order to keep a cow in her stall for two revolutions manual override switches are provided for overriding the signals from magnetic switches 218A or 218B. The door control override switch is indicated at 225 in FIG. 8, schematically, and is positioned on the control console 42. The switch 225 operates the relay 221 which opens normally closed contacts to interrupt the circuits from the magnetic switches 218A and 218B so that the cylinder 215 is not actuated, when the respective magnet aligns with the magnetic switch. The door is retained in its closed position at the same time the cow is adjacent the exit opening. The cow will go around another time.

At the same time, the operator will close a manual switch 226 on the console that actuates an entry door solenoid control valve 222 that will in turn supply fluid under pressure to a pneumatic actuator 223 that has a rod 224 acting on a bracket 225 from the door 35 (for the entry area) to roll the door 35 along its track 35A and close the door, so that the leading edge of the door 35 will be adjacent the corner 201. This will keep the cow that has gone by the exit area on the platform, and the cow cannot get out through the entry opening 30. The switch 221 is also connected to energize a relay 206 to open contacts to disable the magnetic switches 200A and 200B, respectively, so that while the entry door 35 is closed these magnetic switches cannot operate and the actuators 33A and 33B will not be energized so that any cow in the prep stalls 32A or 32B that would normally be released, will be retained until the next cycle comes into position. The relay 206 can include a lock "on" circuit that is operative as long as the door 35 is closed. The operator then may move the manual switch 226 to position to energize the valve 222 in opposite direction and open the door 35 by admitting fluid under pressure to the actuator 223 to retract rod 224 and thus pull the door open to its normal position. The relay 206 is then also disabled and switches 218A and 218B are again operative when the door 35 is open.

The controls can be modified if desired, but it should be noted that the entry door is controlled manually so that it can be closed to keep a cow on the platform, and at the same time the entry door is closed, the sequencing operation of the prep stalls is interrupted because a stall on the platform will be filled by the cow retained, for another turn around the platform.

Likewise, if the stepping switch 212 is being used in the sequencing operation, the relay 206 would interrupt the signal from the stepping switch for one time, until the door 35 was again opened.

The exit doors keep the cow quiet until the rotating stall is abreast of the opening for exiting, at which time the door will open and the cow can go immediately out. This makes it easy for one operator to keep running the system and insures that the milker does not have to be removed from the cow until the stall is right at the exit area. This also shortens the distance necessary to walk to the entrance area to attach the milker to the new cow coming in.

Thus with the use of the speed indicator, the operator can slow down the table for taking care of some minor abnormalities, and then bring the speed up to its optimum speed quickly by watching the indicator and pressing the suitable control bottom. The operator can hold a cow on the platform for another turn around the platform if the milking is not completed by holding the exit gate or door 35 closed manually. When closing the entry door, the sequencing of the prep stalls is interrupted one time.

The rotating milking parlor as shown includes the features of having individual stall sections bolted together to form an annular platform on which the cows can be placed for milking purposes, and which also supports a walkway for the operators, and a unique power drive system.

In operation, the cows will enter through the entry areas 30, and enter onto an empty stall, carried by the platform 16 of that stall. Then, shortly after entry an operator will place a milker on the cow, and the cow will be milked as the platform moves around the parlor. The operator can handle several cows at the same time, and is only a short distance between the cows. In addition the operator can walk on the walkway, or be carried by the walkway as he is installing the milker or removing the milker, and can quickly take care of any of the problems that might arise. When the cow reaches the exit opening 31 after being carried around on the platform, the cow will leave the stall through the open side of the stall to the exit alley. Then that stall will again be used as that stall is moved to the entry opening.

It should also be noted that the turntable has an electrical ground to insure that stray currents do not bother the cows as they step on and off the platform. The ground can be supplied through a slip ring arrangment.

What is claimed is:

1. In a rotating milking parlor having a support floor, an upright wall fixed around the periphery of said floor and having an interior wall surface, an annular platform adjacent said interior surface of said wall, said platform being made up of a plurality of interconnected individual cow stall sections forming said annular platform, means mounted on and positioned below said platform to support said annular platform above said floor to permit movement of said platform in a circular path, and cleaning means mounted on said platform and engaging the interior of said upright wall to clean said wall as said platform moves in circular path.

2. The combination as specified in claim 1 wherein said pedestal means include a rotatable wheel, a track means positioned on said floor and extending in a circle adjacent to the interior of said wall, said wheel engaging the upper surfaces of said track means, and guide means along the outer surfaces of said track means to prevent said rotatable wheel from slipping off said track means in direction toward the center of the parlor.

3. In a rotating milking parlor having a support floor, an upright wall at the periphery of said floor and having an interior surface, and an annular platform positioned adjacent the interior surface of said wall, said annular platform being made up of a plurality of individual stall sections, each having support means for a cow, each stall section having end members fixed to the adjacent stall sections to form said annular platform, each stall section being of size to support a single cow, pedestal means mounted on and positioned below each stall section and having movable support means mounted thereon to permit movement of said annular platform with respect to said floor in a circular path, and an operator support platform member mounted on said annular platform and supported from each of said stall sections on a side thereof toward the center of rotation of said platform and being positioned substantially below the surface of said support means for the cow on each of said stall sections.

4. The combination specified in claim 3 wherein said floor includes an offset section adjacent the inner edges of said operator platform members, said offset section permitting the upper surface of said operator platform members to be substantially on a level with the floor extending inwardly toward the center of the building from said operator platform member.

5. A rotating milking platform having surfaces for supporting cows thereon, means to support said platform for rotation about a substantially upright axis, means to drive said annular platform comprising a depending flange fixed to the periphery of said annular platform and having a first surface generally parallel to the axis of rotation of the annular platform, power means comprising a drive wheel, and a pressure backup wheel means, means to mount said drive wheel in position with the periphery thereof engaging said first surface of said depending flange and including a first member, means between said first member and said pressure wheel means to mount said pressure wheel means to engage a surface of said flange opposite from the first surface, means to resiliently urge said pressure wheel means against said opposite surface of said flange, said pressure wheel means and said drive wheel being mounted on a common drive member, and means to pivotally mount said common drive member independently of said annular platform about an axis substantially parallel to said upright axis to permit said common member to move about its axis to accommodate changes in the position of said depending flange as the platform rotates.

6. A rotating milking parlor comprising a power driven rotating platform, a plurality of cow stalls on said platform, a building wall surrounding said platform, said stalls having an open side facing said wall, an entry opening and an exit opening defined in said building wall, an exit door mounted on said wall for movement to and from a normally closed position blocking said exit opening, means providing a signal indicating that a stall is positioned in a desired relationship to the exit opening as the platform rotates, and control means responsive to said signal to open said exit door.

7. The combination of claim 6 and manual operable means to disable said means providing a signal while permitting said platform to continue to rotate.

8. The combination as specified in claim 6 and entry door means mounted adjacent said entry opening and movable to position to close said entry opening, and control means to move said entry door means to its closed position.

9. The combination as specified in claim 6 wherein said signal means comprises a position indicator on each stall, and a device responsive to said position indicator mounted adjacent said platform on said building wall.

10. A milking parlor comprising a rotating platform, a plurality of cow stalls on said platform, an entry opening to permit entry of cows onto said platform, a plurality of preparation stalls positioned with respect to said milking parlor adjacent said entry opening, said preparation stalls each being adapted to hold a cow for preparation for milking, exit gate means for each preparation stall, separate actuator means to open each of said exit gate means, and means to provide a signal indicating a cow stall on said platform is adjacent the entry opening and to operate one of said actuator means to open said exit gate means for one of said preparation stalls, said means to provide a signal including means to sequentially open the exit gate means of the preparation stalls.

11. The combination as specified in claim 10 wherein said means providing a signal to open the exit gate means of said preparation stalls is timed so that the rotationally leading end of a cow stall on the rotating platform has moved past the entry opening when a cow released from a preparation stall reaches the entry opening, and wall means positioned to define a relatively narrow entry opening and extending on a substantially radial line from the rotating platform whereby a cow stepping onto the platform turns a corner to move her rear quarters toward an inner side of said cow stall.

12. The combination as specified in claim 10 and entry door means movable to a closed position to close the entry opening, and means to interrupt operation of said exit gate actuator means when the entry door is closed.

13. The combination as specified in claim 10 wherein said means to provide a signal comprises a first portion carried by each cow stall on said platform and a second portion stationarily mounted on a portion of said milking parlor.

14. The combination as specified in claim 13 wherein said first portion comprises a magnet and said second portion comprises a magnetically actuated switch.

15. In a rotating milking parlor including a platform having surfaces for supporting cows thereon, and forming a continuous platform for supporting said cows and having means to support said platform for rotation about an upright axis, the improvement comprising drive means for said platform including a depending peripheral flange attached to said platform, an arm member, means to pivotally mount said arm member for movement transverse to said flange, a drive wheel mounted on said arm member in position to frictionally engage said flange, at least one back-up wheel on the opposite side of said flange from said drive wheel, means to resiliently mount said back-up wheel with respect to said drive wheel to urge said back-up wheel toward said drive wheel and to resiliently capture said flange between said back-up wheel and said drive wheel, and power means to carry power to said drive wheel as said arm pivots.

16. The combination specified in claim 15 wherein said power means comprises a shaft, said shaft forming a pivot shaft for said arm and a power shaft, and power drive means drivably extending from said shaft to said drive wheel.

17. The combination of claim 15 and a wall member surrounding said platform, said wall member having an opening therethrough, stall means on said platform, said stall means having an open side facing said wall means whereby cows entry and exiting relative to said platform occurs when the stall means align with said opening as said platform is rotating.

18. The combination of claim 15 and means to control the speed of rotation of said drive wheel.

19. The combination of claim 18 and means to indicate the relative speed of rotation of said platform.

20. The combination of claim 17 wherein said opening is divided into an entry opening and an exit opening, door means to normally close said exit opening, means to deliver a signal when a stall on said platform is positioned adjacent said exit opening, and control means responsive to said signal to cause opening of said exit door means.

* * * * *